United States Patent
Girgensohn et al.

(10) Patent No.: US 8,310,542 B2
(45) Date of Patent: Nov. 13, 2012

(54) SEGMENTING TIME BASED ON THE GEOGRAPHIC DISTRIBUTION OF ACTIVITY IN SENSOR DATA

(75) Inventors: Andreas Girgensohn, Palo Alto, CA (US); Frank M. Shipman, College Station, TX (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1360 days.

(21) Appl. No.: 11/946,794

(22) Filed: Nov. 28, 2007

(65) Prior Publication Data

US 2009/0134968 A1    May 28, 2009

(51) Int. Cl.
*H04N 7/18* (2006.01)
(52) U.S. Cl. ........ 348/143; 348/700; 382/103; 382/181; 382/224; 382/225
(58) Field of Classification Search .................. 707/100; 709/217; 710/117; 382/103, 181–225; 701/117–118
See application file for complete search history.

(56) References Cited

U.S. PATENT DOCUMENTS

| | | | |
|---|---|---|---|
| 7,143,083 B2 | 11/2006 | Carlbom et al. | |
| 2005/0033758 A1* | 2/2005 | Baxter | 707/100 |
| 2007/0226314 A1* | 9/2007 | Eick et al. | 709/217 |
| 2008/0071465 A1* | 3/2008 | Chapman et al. | 701/117 |

OTHER PUBLICATIONS

Demirdjian et al., "Activity maps for location-aware computing", Proceedings of IEEE Workshop on Applications of Computer Vision (2002).
Larson et al., "An Exploratory Look at In-Store Supermarket Shopping Patterns", Wharton School of Business, University of Pennsylvania (Apr. 2005).
Pingali et al., "Multimedia Retrieval Through Spatio-Temporal Activity Maps", Proceedings of ACM Multimedia, pp. 129-136 (Sep. 30 to Oct. 5, 2001).

(Continued)

*Primary Examiner* — Sath V Perungavoor
*Assistant Examiner* — Nathnael Aynalem
(74) *Attorney, Agent, or Firm* — Morgan, Lewis & Bockius LLP

(57) ABSTRACT

The invention segments detector input according to the time and the level of activity in different geographic regions of a locality. In one embodiment of the invention the detector input is comprised of video stream from one or more cameras to identify activity in the video. In one embodiment of the invention the detector input is comprised of sensor outputs such as RFID, pressure plates, etc. Various embodiments of the invention include identifying boundaries based on the level of activity. In embodiments of the invention, the boundaries can be used to select time dimensions. In one embodiment, by recognizing time dimensions with distinctive activity patterns, systems can better present overviews of activity over time.

22 Claims, 6 Drawing Sheets

OTHER PUBLICATIONS

Porikli, F., "Multi-Camera Surveillance: Object-Based Summarization Approach," http://www.merl.com/papers/docs/TR2003-145.pdf (Mar. 2004).

Santini, S. "Analysis of Traffic Flow in Urban Areas Using Web Cameras", Proceedings of IEEE Workshop on Applications of Computer Vision (2000).

Stauffer et al., "Learning Patterns of Activity Using Real-Time Tracking", IEEE Transactions on Pattern Matching and Machine Intelligence, 22, 8, pp. 747-757, http://people.csail.mit.edu/stauffer/Home/_papers/vsam-pami-tracking.pdf (2002).

Xiang et al., "Activity Based Video Content Trajectory Representation and Segmentation", Proceedings of BMVC, pp. 177-186 (2004).

Yang et al., Efficient Tracking Multiple Objects through Occlusion, Fuji Xerox Co., Ltd. Inventin Disclosure IP-06-025 (2006).

"Tag Team: Tracking the Patterns of Supermarket Shoppers", Knowledge@Wharton, http://knowledge.wharton.upenn.edu (2005).

"Topic 6: Analyzing In-Store Shopping Patterns", Map Analysis, http://www.innovativegis.com/basis/MapAnalysis/Topic6/Topic6.htm (accessed Sep. 21, 2007).

\* cited by examiner

SEGMENTING TIME BASED ON THE GEOGRAPHIC DISTRIBUTION OF ACTIVITY IN SENSOR DATA

CROSS REFERENCE TO RELATED APPLICATIONS

This application is related to the following applications:
(1) "Method and System for Analyzing Fixed-Camera Video via the Selection, Visualization, and Interaction with Storyboard Keyframes," U.S. patent application Ser. No. 11/324,557 by Andreas Girgensohn, et al., filed Jan. 3, 2006;
(2) "Methods and Interfaces for Event Timelines and Logs of Synchronized Video Streams," U.S. patent application Ser. No. 11/324,971 by Andreas Girgensohn, et al., filed Jan. 3, 2006; and
(3) "Methods and Interfaces for Visualizing Activity across Video Frames in an Action Keyframe," U.S. patent application Ser. No. 11/324,355 by Andreas Girgensohn, et al., filed Jan. 3, 2006.

These three U.S. patent applications (1)-(3) are hereby expressly incorporated by reference in their entireties.

FIELD OF THE INVENTION

The present invention relates to algorithms for segmenting video streams according to the time and the level of activity in different geographic regions of a locality. By recognizing time segments with distinctive activity patterns, systems can better present overviews of activity over time.

SUMMARY OF THE INVENTION

Sensors that can be used to identify activity, including video surveillance systems, can be used in commercial, industrial, and residential environments. However, the attentiveness of human monitoring especially as the number of video streams is increased, constrains the cost efficiency and effectiveness of such systems. Tag Team describes such analysis in a retail setting based on inferring paths through a store based on the items bought by each customer (see "Tag Team: Tracking the Patterns of Supermarket Shoppers", Knowledge@Wharton, http://knowledge.wharton.upenn.edu, 2005). Larson collects paths through a supermarket using Radio Frequency Identification tags (RFIDs) on shopping carts, and clusters paths to identify several typical behaviors (see J. Larson, E. Bradlow, and P. Fader, "An Exploratory Look at In-Store Supermarket Shopping Patterns", Wharton School of Business, University of Pennsylvania).

In various embodiments of the present invention, algorithms and interfaces analyze activity in recorded data. In an embodiment of the present invention, the recorded data can be a video stream from multiple cameras in multiple locations. In an embodiment of the present invention, a goal of collecting data from sensors can be to understand patterns of activity in the locality being monitored. In an embodiment of the invention, understanding patterns of activity can be useful for predicting future activity. In an embodiment of the invention, understanding patterns of activity can be used in predicting activity in cases where activity can be periodic (e.g., activity that varies in a daily or weekly pattern). In an embodiment of the invention, understanding patterns of activity can be used in identifying anomalous activity (e.g. activity outside of the norm for a given period). In an embodiment of the invention, understanding patterns of activity can be used for post-hoc analysis of activity.

In an embodiment of the present invention, these forms of analysis can be aided by identifying time segments where the activity can be distinctive. Such segments can be used to recognize the periodic nature of activity or to more generally interpret activity over time. In situations where anomalous activity is to be identified, segmentation enables a more precise representation of common activity during a period.

BRIEF DESCRIPTION OF THE DRAWINGS

Preferred embodiments of the present invention will be described in detail based on the following figures, wherein.

DETAILED DESCRIPTION OF THE INVENTION

Figure 1:
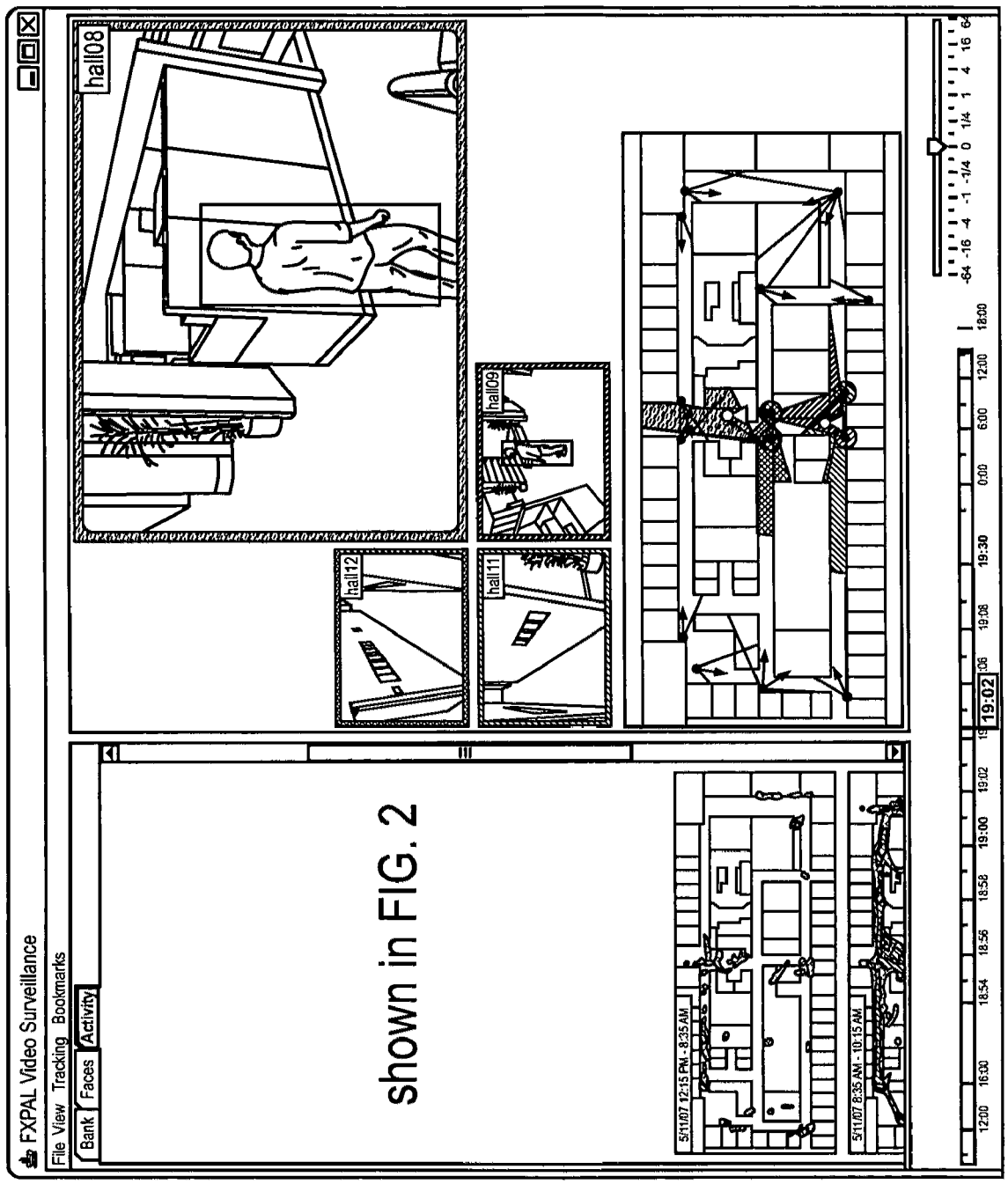
FIG. 1 shows an artists impression of the visualization shown in FIG. 4 where heat maps integrated into a security video application are in the pane on the left, where the cumulative activity detected by sensors is coded with a key, where black corresponds to the color red, left to right diagonal line shading corresponds to the color yellow, right to left diagonal line shading corresponds to the color green, and cross hatch shading corresponds to the color blue, to indicate colors in the heat map. In the pane on the upper right the view from four video streams in different sizes are shown. The large video stream (camera "hall08") best shows the area that the user selected in the heat map (the colors in the heat map represent different levels of activity: red indicates a large amount of activity, yellow and green indicate moderate amounts of activity, and blue a small amount of activity. Areas without any of those four colors only have activity below the minimal threshold). The other three video streams show videos from the vicinity of the user-selected area. All four video streams show recorded video from the time the user selected by making a selection in the menu shown in FIGS. 3 and 6. In the view from the lower right the direction of motion of actors is shown. Colored arrows and colored shaded areas indicate the cameras currently visible in the multi-stream video display. The colors in the map correspond to the colors framing the video displays. In the bottom pane a time line summarizes events with flags where the flags are correlated with different security camera locations.

In an embodiment of the invention, time is segmented based on activity in order to visualize different patterns of activity. In various alternative embodiments of the invention, time is segmented based on activity in a multiple sensor context. In an embodiment of the invention, time is segmented based on activity in a multiple camera context. In various embodiments of the invention, motion detected by a sensor can be quantized and that motion can be used to segment the data feed. In an embodiment of the invention, motion in the field of view of a camera can be quantized and that motion can be used to segment the data feed. In various embodiments of the invention, motion detected by a sensor network can be quantized and that motion can be used to segment the data feed. In an embodiment of the invention, motion in the field of view of a video network can be quantized and that motion can be used to segment the data feed.

Segmenting time based on activity can be much simpler in a single sensor or single camera context than in a multiple sensor or multiple camera context. In the case of sensor networks, such as video surveillance systems, where dozens or hundreds of cameras cover large spaces, measures of activity need to become more sophisticated. This is because having a single measure of activity in the space, such as the sum of activity across all sensors, misses distinctive patterns of activity, and can potentially equate 10 people moving around an entire area with 10 people moving in one specific locality within the area.

Multi camera video surveillance can use a geometric model of the space and object tracking in video to follow an objects movement across cameras. This process results in a representation of one or more objects moving, and their locations over time. This representation can be used to segment time based on activity. Once the time segments are established, they can be used to generate visualizations to aid in comprehension of changes in activity over time and as an index for selecting the source data (for example specific portions of a video stream).

Segmentation of video based on the motion of a single object is known in the art. Some of those segmentation algorithms classify the type of motion to segment the video Demirdjian, D., Tollmar, K., Koile, K., Checka N., and Darrell, T. "Activity maps for location-aware computing", Proceedings of IEEE Workshop on Applications of Computer Vision, 2002 (hereinafter Demirdjian); Porikli, F. "Multi-Camera Surveillance: Object-Based Summarization Approach", 2003, http://www.merl.com/papers/docs/TR2003-145.pdf (hereinafter Porikli). Analyzing quantities of stored video to learn common object motion patterns so that the motion of a specific object can be classified has also been examined, see Stauffer, C., and Grimson, W. E. "Learning Patterns of Activity Using Real-Time Tracking", IEEE Transactions on Pattern Matching and Machine Intelligence, 22, 8 (2000), pp. 747-757 (hereinafter Stauffer); Xiang, T. and Gong, S. "Activity Based Video Content Trajectory Representation and Segmentation", Proceedings of BMVC, 2004, pp. 177-186 (hereinafter Xiang). The goal of segmentation in Demirdjian, Porikli, Stauffer and Xiang was to locate and characterize activity of individual tracked objects, not to characterize the aggregate activity of all objects.

Santini S., "Analysis of traffic flow in urban areas using web cameras", Proceedings of IEEE Workshop on Applications of Computer Vision, 2000 (hereinafter Santini), analyzes aggregate behavior of objects in video frames to help road traffic monitoring in metropolitan areas. However, Santini does not segment time based on different aggregate behavior.

Work on presenting overviews of activity in video can have the goal of visualizing aggregate behavior. Pingali, G., Opalach, A., and Carlbom, I., "Multimedia retrieval through spatio-temporal activity maps", Proceedings of ACM Multimedia, 2001, pp. 129-136 (hereinafter Pingali) use heatmaps as a retrieval interface for video; U.S. Pat. No. 7,143,083. However, Pingali does not attempt to segment the video based on activity and does not present different visualizations for different time intervals. In addition Pingali does not use menus for selecting between activity at a location.

In an embodiment of the present invention, the geographic space being monitored can be modeled, in particular the space being monitored can be divided into a grid (an area being divided into a two dimensional grid, a volume into a three dimensional grid). Changes in activity within each portion of the model can be monitored to determine time segments. In an embodiment of the invention, histograms of activity can be compared, where the activity value for each portion of the grid is one element in a histogram.

In an embodiment of the present invention, the segmenting of the period of analysis into distinctive time windows can involve three stages: identifying activity in a sensor or video camera network, recording and spreading this activity in time and space, and recognizing boundaries in the activity patterns. In an embodiment of the invention, an observation pattern can be determined by first dividing the locality into a plurality of geographic localities, wherein a plurality of sensors can each sense in at least one or more geographic localities within the locality, and next identifying an activity distribution based on detecting activity of one or more object in one or more of the plurality of geographic localities. Based on the activity distribution over a time period temporal activity segments can be determined which can be used to identify the observation pattern. In an embodiment of the invention, the temporal activity segments can be identified by identifying potential temporal boundaries and then determining the activity distribution prior to and after the potential temporal boundaries wherein only one peak in the change in activity is located in the temporal activity segments. In various embodiments of the invention, a variety of thresholds can be used to limit the number of peaks in the change in activity thereby satisfying the one peak per temporal activity segment requirement. In an embodiment of the present invention, the segments can be the basis of user interface design for visualizing and accessing activity in the sensor data.

Identifying Activity

In an embodiment of the present invention, identifying and locating activity in the space covered by the sensor or video camera network can be the first step. In an embodiment of the present invention, collecting measures of activity can occur in many ways; person tracking in video, RFID events, movement sensors, heat sensors, sound sensors, odor sensors or pressure sensors. In an embodiment of the invention, previously described algorithms for identifying moving objects in video and their location can be utilized. In an embodiment of the present invention, a requirement can be to have <location, time> pairs for activity in the space.

Spreading Activity in Time and Space

The amount and type of activity in a space can be highly variable. This variance can result in a high level of noise when calculating the statistics of the raw object counts and locations when trying to recognize periods of activity. In an embodiment of the invention, the effect of this variance can be reduced when trying to recognize distinctive periods of activity, by spreading the recognized activity across time and space.

In an embodiment of the invention, to spread activity over time, the time dimension is divided into small chunk lengths (e.g. 5 minute chunks) and any observed activity is spread over time in a one dimensional distribution length (e.g. the distribution function can be a Poisson distribution and the distribution length can be 30 minutes such that a Poisson distribution over the 30 minutes surrounding the observed event is analyzed). In various embodiments of the invention, alternative chunk lengths, distribution functions and distribution lengths can be used.

In an embodiment of the invention, to spread activity in space, observed activity can be allocated to the geographic elements near the observation. In an embodiment of the invention, the geographic elements can be modeled by a simple cubic grid In an embodiment of the invention, the geographic elements can be modeled by a simple two dimensional grid. In an embodiment of the invention, to allocate activity to the grid, each observation of an object is spread over a three dimensional locality with the center being the computed position of the object. In an embodiment of the invention, to allocate activity to the grid, each observation of an object is spread over a two dimensional locality with the center being the computed position of the object. In an embodiment of the invention, for efficiency of computation, the locality can be a cube. In an embodiment of the invention, for efficiency of computation, the locality can be a square. The sides of the locality can be six meters. In various embodiments of the invention, other shapes and sizes can be used. If the object resides completely in one grid element, then 100% of the objects activity can be attributed to that element. Otherwise the portion of the object that is in each grid element can be assigned to that element. Thus, the observance of an object on the border between two grid elements can give 50% of the activity to each of the two elements.

Recognizing Boundaries in Activity Patterns

In an embodiment of the invention, the recognition of boundaries can begin once the observed activity has been spread across time and space. In an embodiment of the invention, boundaries can be identified at intervals equivalent to the chunk size used to spread activity over time. In various embodiments of the invention, multiples of this size can be used.

In an embodiment of the invention, the activity can be computed in a fixed period prior to the potential boundary to the activity, and in the same length period after the potential boundary. This, computation can occur for each grid element. The computed prior and after activity can be a weighted sum of the activity allocated to a number of time windows prior and after the potential boundary, respectively. In an embodiment of the invention, an even weighting of the six prior and following time chunks can be used. The difference between these two values for a grid element can be the change in activity for that grid element at that time. The sum of the absolute differences across all grid elements can be a measure of change in activity across the space as a whole at that time.

In an embodiment of the invention, once the change in activity of the whole space has been calculated at each potential boundary, the peaks in this measure can be located to select boundaries. In an embodiment of the invention, the selection of boundaries can be such that no boundary can be within a predefined minimum segment length of another boundary. In an embodiment of the invention, a predefined minimum segment length can be 60 minutes. In an embodiment of the invention, any peaks within the predefined minimum segment length of selected boundary or within the predefined minimum segment length of a higher level change peak that was not selected as a boundary are not considered. Once peaks have been filtered based on this rule, the time period is segmented based on the remaining peaks that are above a pre-defined minimum activity level.

Visualizing and Accessing Activity Patterns

Once time has been segmented into periods based on activity, these segments can be used in an interactive visualization to facilitate comprehension of changes in activity over time.

Our visualization consists of heat maps of activity in the different time segments. The visualization of activity in each heat map is normalized based on the length of the time segment. In this way, the same average level of activity over time between segments of different length will appear the same in the visualization. These heat maps are also used to provide indexes into the video at the start of a segment and to activity at a location during a time segment.

DEFINITIONS

The term 'locality' is used herein to refer to a three dimensional volume or a two dimensional area in which the sensing is being monitored. The term 'geographic locality' is used herein to refer to a three dimensional volume or two dimensional area constituting a portion of the locality. The term 'geographic distribution' is used herein to refer to the movement over time of a person or object in the locality. The term 'sensor' is used herein to refer to a method of detecting movement over time in the locality including visual, audio, olfactory and pressure or reactionary force sensing. The term 'sensor output' is used herein to refer to the result generated by the sensor, including the following non-limiting examples such as a video camera used as a visual and/or audio detector generating video or audio output, leak detectors or atmospheric pressure ionization detectors used to detect chemicals and odors and pressure detectors used to detect gravitational and non gravitational forces of objects. The term 'object' includes solid, liquid and gaseous substances, wherein persons and physical objects exemplify solid objects while liquids or gases represent alternative forms of objects. The term 'activity' is used to refer to a sensor detecting an object in one or more geographic locality. The term 'movement' is used to refer to an object in one or more geographic locality that moves over time to one or more different geographic locality.

EXAMPLE

Initial algorithms have been implemented and included in a security video browser and player. Alternative algorithms for determining activity and interest, segmentation, and alternate visualizations of activity are under development.

Figure 2:
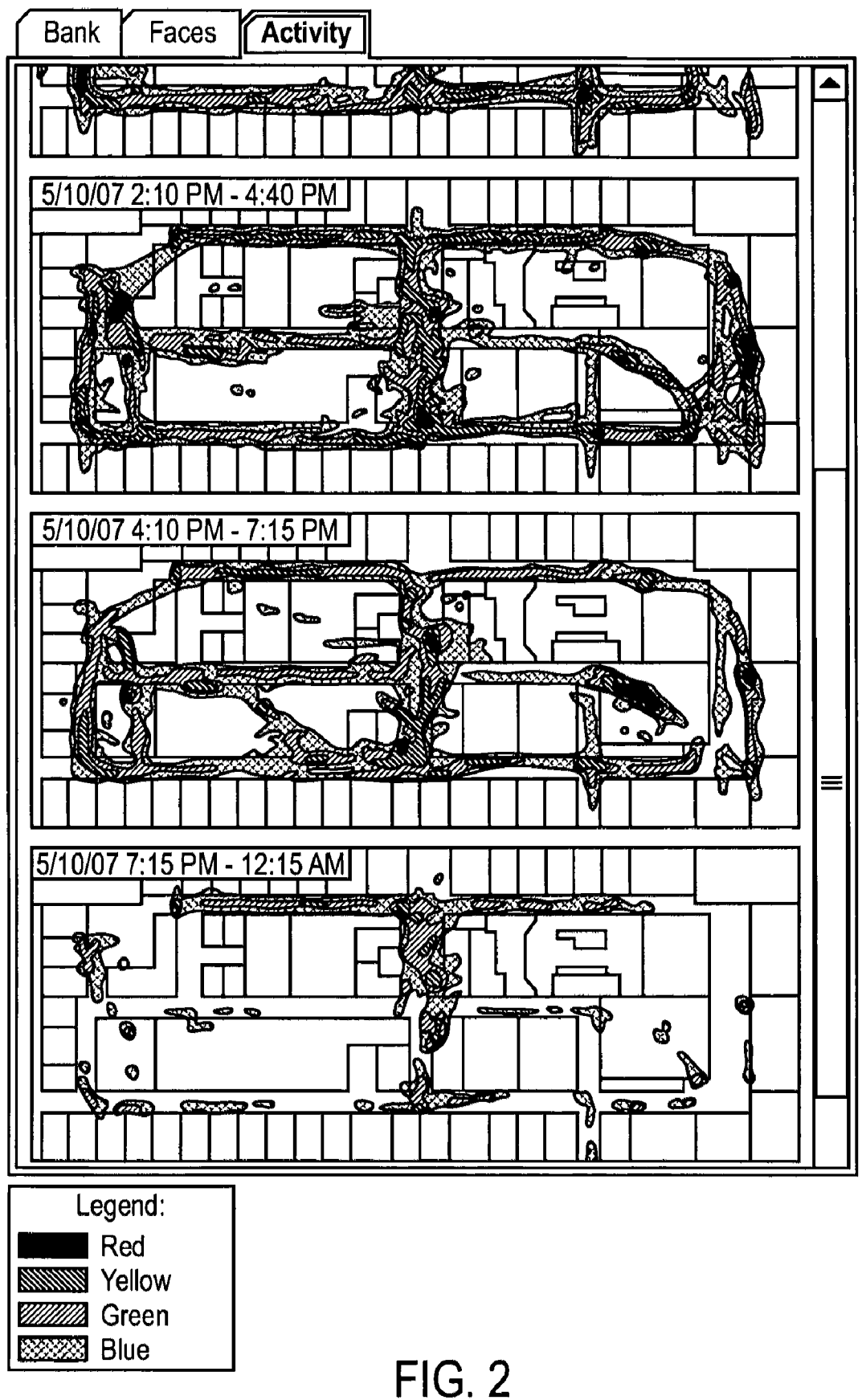
FIG. 2 shows an artists impression of FIG. 5, which illustrates a close up of three of the heat maps shown in the left pane of FIG. 1. The heat maps shown represent different time intervals determined by segmenting time based on patterns of activity according to an embodiment of the invention. Each heat map shows the cumulative activity for the corresponding time interval.
Figure 4:
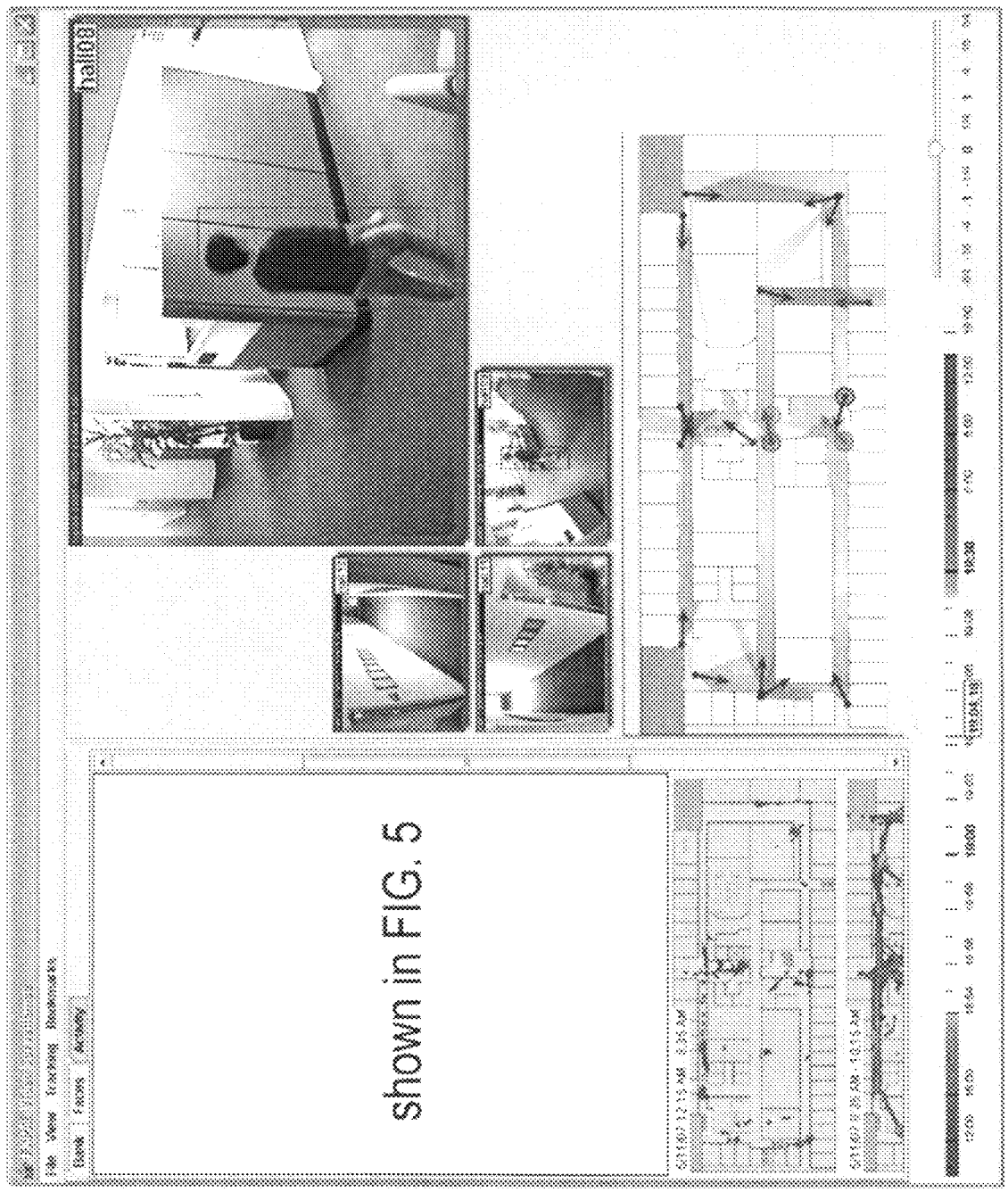
FIG. 4 shows a visualization where heat maps integrated into a security video application are in the pane on the left. In the pane on the upper right of the application window the view from four video streams in different sizes are shown. The large video stream (camera "hall08") best shows the area that the user selected in the heat map. The other three video streams show videos from the vicinity of the user-selected area. All four video streams show recorded video from the time the user selected by making a selection in the menu shown in FIG. 6. In the view from the lower right the view directions of video cameras are shown. Colored arrows and colored shaded areas indicate the cameras currently visible in the multi-stream video display. The colors in the map correspond to the colors framing the video displays. In the bottom pane a time line indicates the current video playback position.
Figure 5:
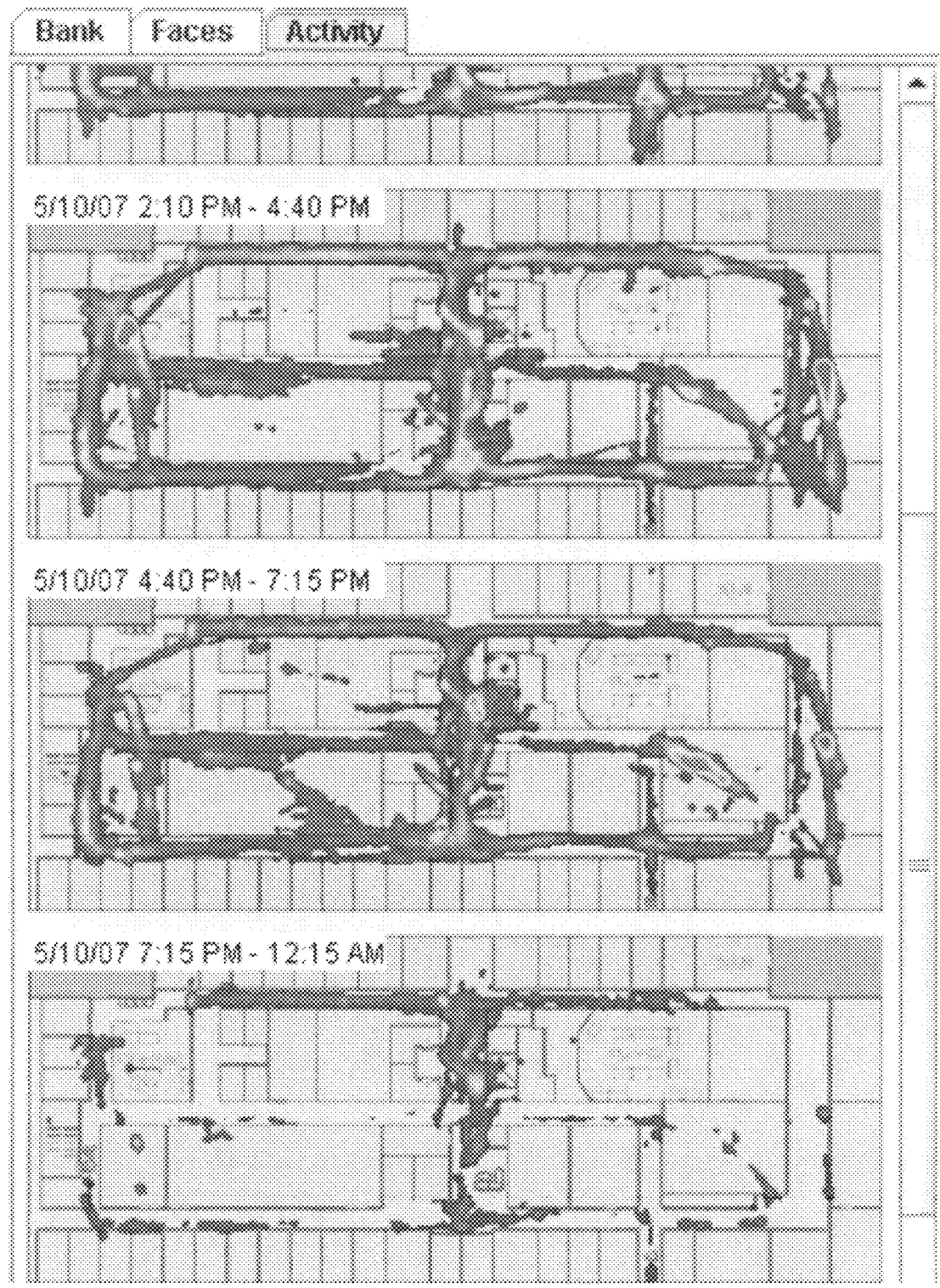
FIG. 5 shows a close up of three of the heat maps shown in the left pane of FIG. 4. The heat maps shown represent different time intervals determined by segmenting time based on patterns of activity according to an embodiment of the invention. Each heat map shows the cumulative activity for the corresponding time interval.

FIGS. 1 and 4 show a visualization where heat maps are integrated into a security video application. The heat maps are in the pane on the left. FIGS. 2 and 5 show a close up of two of the heat maps. The time period is shown on the heat map and users can click on a point in the heat map to select cameras that can see that location and start playback of video at the beginning of that time segment.

Figure 3:
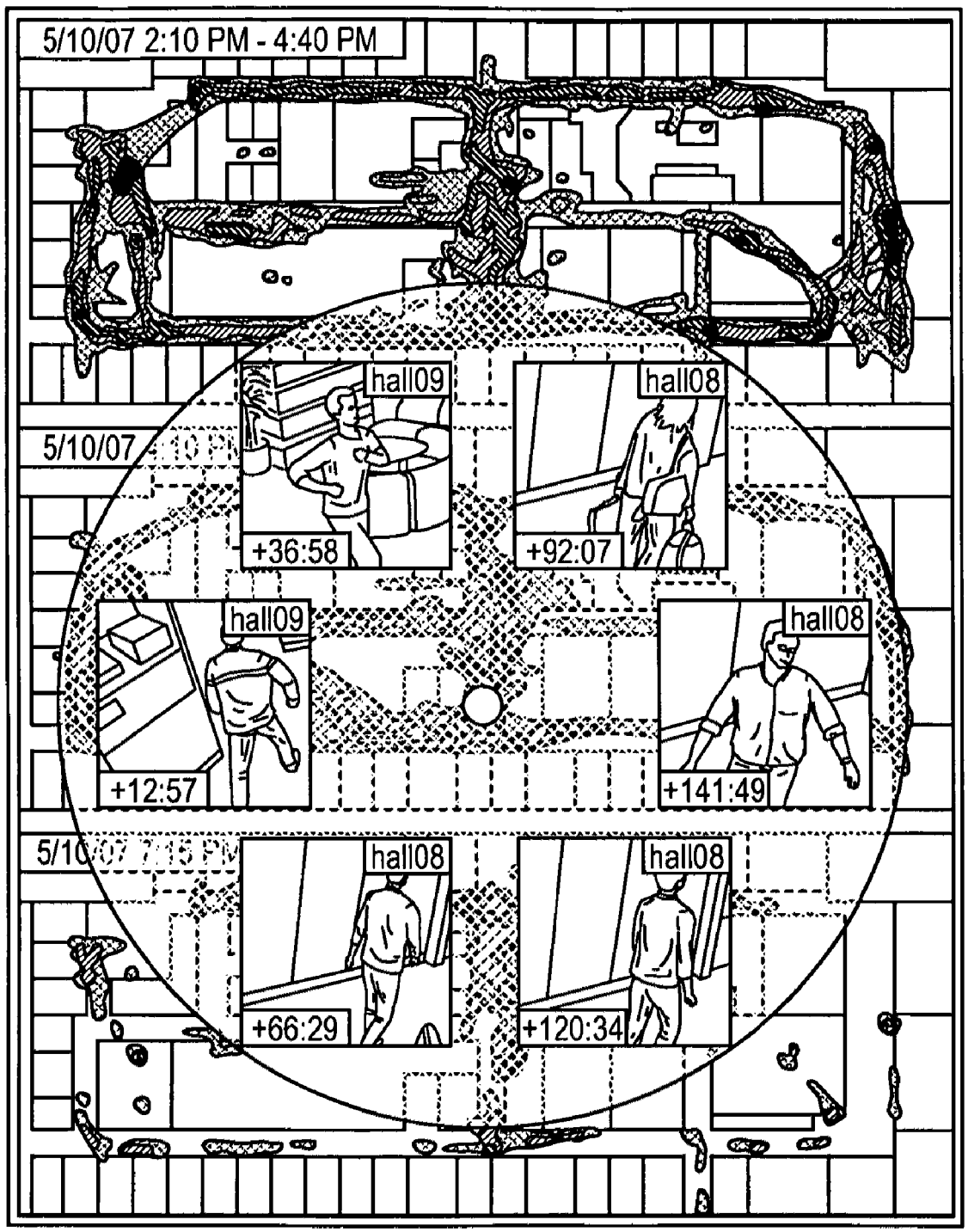
FIG. 3 shows an artists impression of FIG. 6, which illustrates a radial menu that is shown in response to the user clicking on a point on a heat map. The position of the click selects a location of the floor plan and the selected heat map selects the time interval. The menu shows selected keyframes representing activity during the time interval around the selected location. Those keyframes are selected such that they cover the whole time interval. The times in the bottom left of the keyframes indicate the relative time in minutes and seconds since the start of the time interval. The labels in the top-right of the keyframes indicate the camera that captured the activity.
Figure 6:
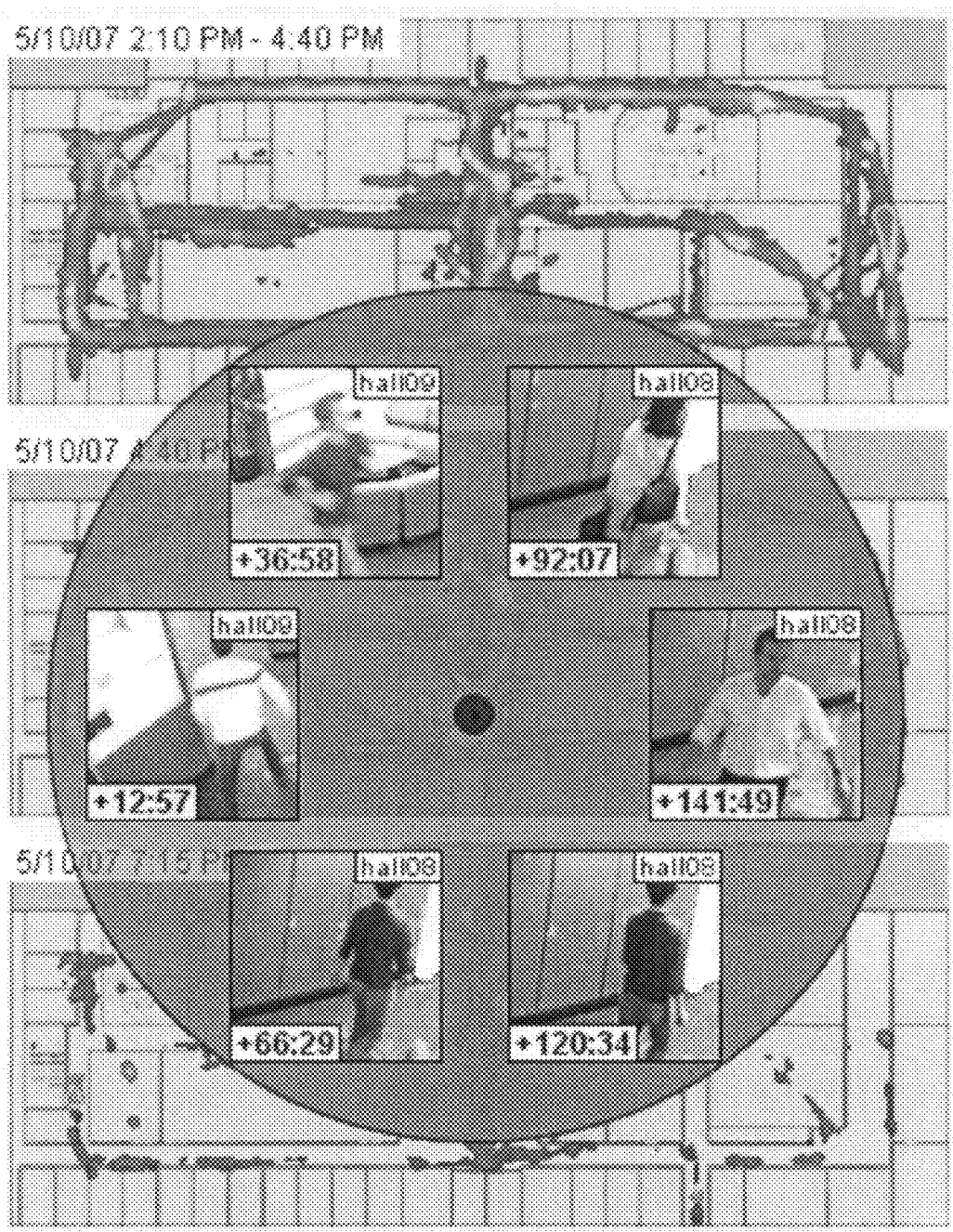
FIG. 6 shows a radial menu that is shown in response to the user clicking on a point on a heat map. The position of the click selects a location of the floor plan and the selected heat map selects the time interval. The menu shows selected keyframes representing activity during the time interval around the selected location. Those keyframes may show a complete video frame or the area of the video frame corresponding to the detected activity. Those keyframes are selected such that they cover the whole time interval. The times in the bottom left of the keyframes indicate the relative time in minutes and seconds since the start of the time interval. The labels in the top-right of the keyframes indicate the camera that captured the activity.

In an embodiment of the invention, to understand locations of activity, users can select among the activity at a location during the time segment. In an embodiment of the invention, the activity at that location in the time segment is clustered and presented as a hierarchy of pie menus. FIGS. 3 and 6 show a menu for selecting activity at a particular location during the time period. In an embodiment of the invention, clustering of activity at a location can be based on time. In various alternative embodiments of the invention, clustering of activity at a location can be based on characteristics of the activity (e.g. the person, the color of the object, the type of motion). The menu for selecting activity may contain keyframes from video corresponding to a sensor output. The keyframe may show the whole video frame or the area corresponding to the sensor output.

Various embodiments of the invention may be implemented using a processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of component circuits, as will be readily apparent to those skilled in the art.

Various embodiments include a computer program product which can be a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information, which can be used by one or more processors to perform any of the features, presented herein. In various embodiments, the transmission may include a plurality of separate transmissions.

Stored on one or more computer readable media, the present disclosure includes software for controlling the hardware of the processor(s), and for enabling the computer(s) and/or processor(s) to interact with a human user or other device utilizing the results of the present invention. Such software may include, but is not limited to, device drivers, interface drivers, operating systems, execution environments/containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers, interface drivers and remote software to do the function. The invocations or calls can include invocations or calls in distributed and client/server systems.

What is claimed is:

1. A method performed by a computer system coupled with a plurality of cameras, each camera configured to monitor at least one or more geographic localities of a plurality of geographic localities, wherein a contiguous locality is divided into a grid of the plurality of geographic localities, the method comprising:
  receiving information about activity of a plurality of objects in one or more of the plurality of geographic localities;
  identifying a plurality of potential temporal boundaries;
  for each potential temporal boundary, determining a change in activity based on activity of the plurality of objects prior to the potential temporal boundary and activity of the plurality of objects after the potential temporal boundary;
  identifying one or more temporal activity segments based on the change in activity for the plurality of potential temporal boundaries over a time period; and
  identifying an observation pattern based on the one or more temporal activity segments.

2. The method of claim 1, wherein identifying one or more temporal activity segments includes:
  locating one or more peak in the change in activity for the plurality of potential temporal boundaries;
  filtering the one or more peaks located based on one or more thresholds; and
  identifying temporal activity segments based on the one or more filtered peaks such that each temporal activity segment includes only one filtered peak.

3. The method of claim 2, where the thresholds are selected such that no boundary of a temporal activity segment is located within a predefined minimum segment length from a boundary of a second temporal activity segment.

4. The method of claim 1, wherein the method further comprises depicting amount of activity by displaying a heat map.

5. The method of claim 1, wherein the time period is based on a chunk length filtered by a distribution function over a distribution length.

6. The method of claim 5, wherein the chunk length is between:
  a lower limit of approximately 1 minute; and
  an upper limit of approximately 10 minutes.

7. The method of claim 5, wherein the distribution function is a Poisson distribution and the distribution length is between:
  a lower limit of approximately twice the chunk length; and
  an upper limit of approximately twenty times the chunk length.

8. A method performed by a computer system coupled with a plurality of cameras, each camera configured to monitor at least one or more geographic localities of a plurality of geographic localities, wherein a contiguous locality is divided into a grid of the plurality of geographic localities, the method comprising:

receiving information about activity of a plurality of objects in one or more of the plurality of geographic localities;

identifying a plurality of potential temporal boundaries;

for each potential temporal boundary, determining a change in activity based on activity of the plurality of objects prior to the potential temporal boundary and activity of the plurality of objects after the potential temporal boundary;

identifying temporal activity segments based on the change in activity for the plurality of potential temporal boundaries over a time period; and displaying the activity of the plurality of objects for one or more selected temporal activity segments.

9. The method of claim 8, comprising:
depicting the activity as a heat map;
selecting one or more keyframes representing activity during the one or more selected temporal activity segments; and
displaying the one or more selected keyframes.

10. The method of claim 8, comprising:
depicting the activity as a heat map over a floor plan;
selecting one or more keyframes representing activity at a selected location on the floor plan; and
displaying the one or more keyframes.

11. The method of claim 8, wherein:
a map is used to show the geographic position of one or more sensors,
a code is used to indicate the sensor position, and
the code correlates with the code used in displaying the activity of the plurality of objects.

12. The method of claim 9, including:
receiving selection of a keyframe of the one or more displayed keyframes; and
in response to receiving selection of the keyframe of the one or more displayed keyframes, magnifying the selected keyframe or playing a video segment corresponding to the selected keyframe.

13. The method of claim 8, wherein the time period is based on a chunk length filtered by a distribution function over a distribution length.

14. The method of claim 13, wherein the chunk length is between:
a lower limit of approximately 1 minute; and
an upper limit of approximately 10 minutes.

15. The method of claim 13, wherein the distribution function is a Poisson distribution and the distribution length is between:
a lower limit of approximately twice the chunk length; and
an upper limit of approximately twenty times the chunk length.

16. A non-transitory computer readable medium storing a program, for execution by one or more processors of a computer system, the program including instructions for:

receiving information about activity of a plurality of objects in one or more of a plurality of geographic localities;

identifying a plurality of potential temporal boundaries;

for each potential temporal boundary, determining a change in activity based on activity of the plurality of objects prior to the potential temporal boundary and activity of the plurality of objects after the potential temporal boundary;

identifying temporal activity segments based on the change in activity for the plurality of potential temporal boundaries over a time period; and displaying the activity of the plurality of objects for one or more selected temporal activity segments.

17. The computer readable medium of claim 16, wherein the program includes instructions for:
depicting the activity as a heat map;
selecting one or more keyframes representing activity during the one or more selected temporal activity segments; and
displaying one or more selected keyframes.

18. A system for visualizing a pattern of activity from a plurality of sensor output, comprising one or more processors and memory storing one or more programs for execution by the one or more processors, the one or more programs including instructions for:

receiving information about activity of a plurality of objects in one or more of the plurality of geographic localities;

identifying a plurality of potential temporal boundaries;

for each potential temporal boundary, determining a change in activity based on activity of the plurality of objects prior to the potential temporal boundary and activity of the plurality of objects after the potential temporal boundary;

identifying temporal activity segments based on the change in activity for the plurality of potential temporal boundaries over a time period; and displaying the activity of the plurality of objects for one or more selected temporal activity segments.

19. The system according to claim 18, wherein the one or more programs further include instructions for:
depicting the activity as a heat map and
selecting one or more keyframes representing activity during the one or more selected temporal activity segments; and
displaying one or more keyframes.

20. The method of claim 1, wherein determining, for each potential temporal boundary, a change in activity includes:
for each potential temporal boundary:
for each geographic locality:
determining activity of one or more objects in the geographic locality prior to the potential temporal boundary;
determining activity of one or more objects in the geographic locality after the potential temporal boundary; and
determining a change in activity for the geographic locality for the potential temporal boundary from the activity of one or more objects in the geographic locality prior to the potential temporal boundary and the activity of one or more objects in the geographic locality after the potential temporal boundary; and
determining the change in activity for the potential temporal boundary from the change in activity for each geographic locality.

21. A computer system, comprising:
one or more processors; and
memory storing one or more programs, the one or more programs including instructions for:
receiving information about activity of a plurality of objects in one or more of a plurality of geographic localities;

identifying a plurality of potential temporal boundaries;

for each potential temporal boundary, determining a change in activity based on activity of the plurality of objects prior to the potential temporal boundary and activity of the plurality of objects after the potential temporal boundary;

identifying one or more temporal activity segments based on the change in activity for the plurality of potential temporal boundaries over a time period; and identifying an observation pattern based on the one or more temporal activity segments.

22. A non-transitory computer readable storage medium, storing one or more programs for execution by one or more processors of a computer system, the one or more programs including instructions for:

receiving information about activity of a plurality of objects in one or more of a plurality of geographic localities;

identifying a plurality of potential temporal boundaries;

for each potential temporal boundary, determining a change in activity based on activity of the plurality of objects prior to the potential temporal boundary and activity of the plurality of objects after the potential temporal boundary;

identifying one or more temporal activity segments based on the change in activity for the plurality of potential temporal boundaries over a time period; and identifying an observation pattern based on the one or more temporal activity segments.

* * * * *